April 20, 1937. P. DÈTTENBORN 2,077,384
REGULATING ARRANGEMENT FOR ELASTIC FLUID POWER PLANTS
Filed July 13, 1933
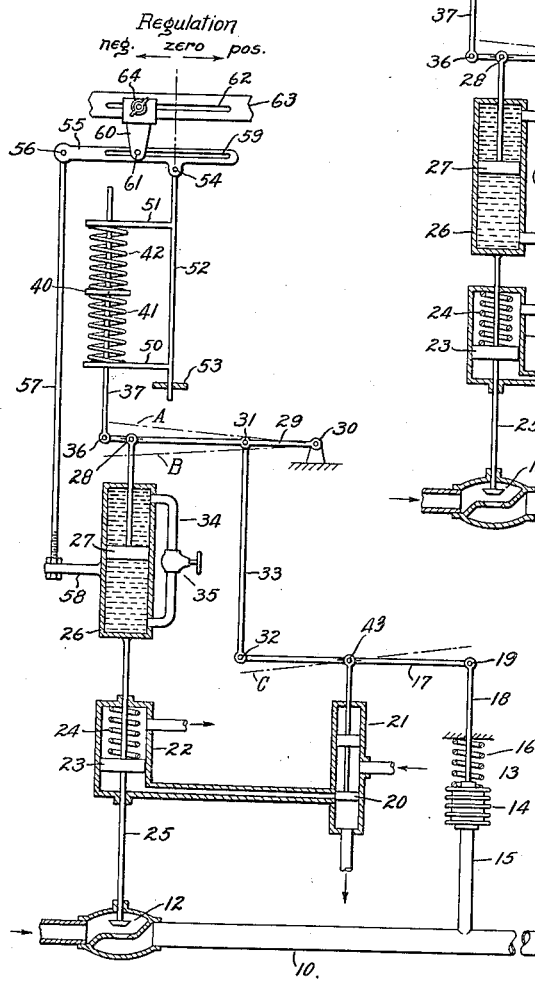
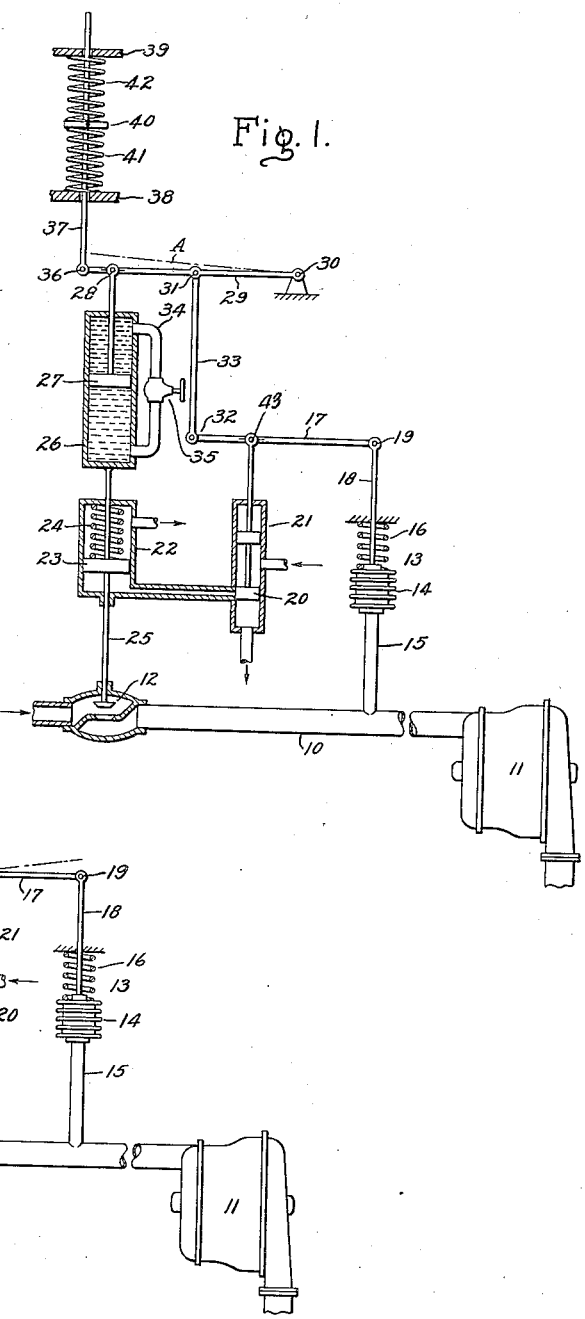
Inventor
Paul Dettenborn
by Harry E. Dunham
His Attorney Patented Apr. 20, 1937

2,077,384

UNITED STATES PATENT OFFICE 2,077,384

REGULATING ARRANGEMENT FOR ELASTIC FLUID POWER PLANTS

Paul Dettenborn, Berlin-Steglitz, Germany

Application July 13, 1933, Serial No. 680,299. In Germany July 16, 1932

4 Claims. (Cl. 50—10)

The present invention relates to regulating arrangements of the kind used in elastic fluid power plants for regulating the flow of elastic fluid through a conduit in response to demand for elastic fluid, more particularly for regulating the flow of elastic fluid from a source such as an elastic fluid generator, an extraction stage or the exhaust of an elastic fluid engine to a consumer such as a heat exchanger, a prime mover or other industrial apparatus. The ordinary regulating arrangements of this kind have a "positive regulation". By a positive regulation I mean a regulation which permits a drop in pressure with increasing flow of elastic fluid. Thus, for example, one speaks of a positive regulation of 5% if a governing arrangement maintains a pressure of 200 lbs. at low or no load and permits this pressure to drop to 190 lbs. at full load. This drop in pressure is an inherent characteristic of the ordinary pressure governor which in many cases is undesirable, particularly when the pressure regulating arrangement is located at a considerable distance from the elastic fluid consumer because to the normal drop in pressure due to the inherent characteristic of the ordinary pressure governor is added another drop in pressure due to the great resistance to flow of a long distance conduit.

The object of the present invention is to provide an improved arrangement for regulating the flow of an elastic fluid conducted through a conduit whereby the pressure, temperature or like condition of the elastic fluid is maintained constant at fluctuating load or if desired increases with increasing load. A governing arrangement by which the pressure or temperature or like condition is maintained constant irrespective of changes in load may be said to have "no regulation", whereas an arrangement in which the pressure or temperature or like condition increases with increasing load may be said to have a "negative regulation". Thus, from another viewpoint, one object of my invention is to provide a governing mechanism with zero or with negative regulation for regulating the flow of elastic fluid through a conduit.

Another object of my invention is to provide an improved construction and arrangement for a regulating mechanism in which means are provided for adjusting the regulation of the governing mechanism whereby positive, zero or negative regulation of the mechanism may be obtained.

For a consideration of what I consider to be novel and my invention, attention is directed to the following description and the claims appended thereto in connection with the accompanying drawing.

In the drawing, Fig. 1 represents a diagrammatic illustration of a governing mechanism embodying my invention and Fig. 2 is a modification of such a governing mechanism.

Referring to Fig. 1, a conduit 10 for conducting elastic fluid from a source, not shown, to a consumer indicated as a turbine 11 is provided with a valve means shown as an ordinary throttle valve 12 for controlling the flow of elastic fluid through the conduit. The valve 12 is positioned to maintain a definite condition of the elastic fluid in the conduit. In the arrangement of Fig. 1, I have shown means for moving the valve to maintain a constant pressure in the conduit 10. These means comprise a device 13 shown as a pressure responsive device including a bellows 14 connected to the conduit 10 by a pipe 15 and biased in downward direction by a spring 16. The bellows is connected to a floating lever 17 by a link 18 pivoted at 19 to the right-hand end of the lever 17. Connected to an intermediate point of the lever 17 is the valve head 20 of a control member or pilot valve 21 for controlling the flow of actuating fluid such as oil to a motor or hydraulic cylinder 22. The latter comprises a piston 23 biased in downward direction by a spring 24 and connected to the valve 12 by a stem 25. An extension of the stem 25 is connected to a dashpot 26, which latter includes a piston 27 connected at 28 to a lever 29 having a fulcrum 30. A point 31 of the lever 29 is connected to the left-hand end 32 of the floating lever 17 by a link 33. The control member or pilot valve 21 is shown in its neutral or normal position in which the valve head 20 covers the port connection to the hydraulic motor 22. The slightest movement of the pilot valve head from its neutral position by the action of the pressure-responsive device 14 causes displacement of fluid in the motor 22, fluid being discharged therefrom if the pilot valve head is moved upward and supplied to the motor head if the pilot valve is moved downward. Such movement of the pilot valve takes place in response to any change in flow condition in the conduit 10.

The dashpot is substantially filled with a fluid such as oil. The spaces defined above and below the piston 27 communicate with each other through a by-pass 34 including an adjustable valve 35. The left-hand end of the fulcrumed lever 29 is pivoted at 36 to a rod 37 projecting through two fixed supports 38 and 39 respectively. Fastened to the rod 37 at a point intermediate the fixed supports is a plate 40 and provided between this plate and the two supports are springs 41 and 42 respectively. The springs are fastened to the plate 40 and the supports 38 and 39 respectively.

During operation of a governing arrangement of the kind above described, the various elements move simultaneously. For a better understanding of the operation, let us analyze these movements and assume that they take place consecutively. Two important elements of the arrangement are the dashpot and the springs 41 and 42. The operation will best be understood by assuming that the valve 35 for the dashpot is closed and the piston 27 of the dashpot has a tight fit with the dashpot cylinder, so that no displacement of fluid between the upper and lower space in the dashpot can take place. In this case the dashpot forms a rigid connecting link between the fulcrumed lever 29 and the piston 23 of the motor. With this assumption the mechanism operates as follows: As long as the demand for elastic fluid remains constant, the pilot valve head 20 covers its port and therefore permits no actuating fluid being supplied to or drained from the motor 22. If now the demand for elastic fluid increases, the pressure of the elastic fluid in conduit 10 drops and causes the bellows 14 to collapse under action of the spring 16, thus moving the right-hand end 19 of the floating lever 17 and accordingly the pilot valve downward. Pilot valve head 20 uncovers its port and permits actuating fluid being supplied to the cylinder 20 below the piston, thereby forcing the piston upward against the biasing force of the spring 24 and opening the valve 12, resulting in an increased flow of fluid through the conduit 10. The increased flow of fluid causes a rise in pressure, effecting expansion of the bellows and upward movement of the right-hand end 19 of the lever 17. The upward movement of the piston 23 causes a similar movement of the dashpot, thus turning the fulcrumed lever 29 about its fulcrum 30 in clockwise direction until the lever 29 reaches a definite position indicated by the dash-dotted line A. This turning motion of lever 29 causes upward movement of link 33 which in turn effects the floating lever 17 to move upward until the pilot valve 20 resumes its original position in which it covers its port. The restoring movement of the pilot valve is accomplished partly by the restoring action of the motor and partly by the expansion of the bellows due to the rise in pressure.

The operation so far described is that of an ordinary regulating mechanism having a positive regulation by which the pressure drops with increasing flow of fluid. By a drop in pressure is meant that the final pressure at the end of the regulation is below the initial pressure which existed before the increased demand for fluid took place. This change in pressure becomes manifest from a consideration of the drawing. As pointed out above, at the end of the regulating action the pilot valve 20 must be restored to its original position shown in the drawing. The pivot 43 of the floating lever 17 will be located where it was located originally. The left-hand end 32, however, has moved somewhat upward. This necessarily means that the right-hand end 19 of the floating lever 17 must have moved downward, from which we may conclude that the bellows 14 is in a somewhat collapsed condition as compared with the original condition and the pressure to which the bellows is subjected, that is, the pressure of the fluid in the conduit 10, is lower than it was before.

Let us now open the valve 35 in the bypass 34 to obtain a further regulation which we may term an "after-regulation". During the regulating movement above described the fulcrumed lever 29 was turned into the dash-dotted line position. This causes compressing of the spring 42 and tensioning of the spring 41, that is, an unbalanced state of the two springs which normally are in balanced condition and are arranged to retain such balanced condition as long as the rod 37 is free to move up and down. The after-regulation comprises a downward movement of the rod 37 under action of the springs until the springs have assumed their original balanced state in which the pivot 36 connecting the rod 37 with the fulcrumed lever 29 has assumed its original position. During the downward movement of rod 37 the piston 27 is moved relative to the dashpot cylinder under displacement of actuating fluid from the lower part of the dashpot cylinder through the bypass into the upper part. Thus the downward movement of the lever 29 under action of the springs effects a reduction of the length of the link represented by the dashpot.

The downward movement of the fulcrumed lever 29 causes through the link 33 and the lever 17 a downward movement of the pilot valve head 20 which reopens its port and permits the supply of actuating fluid to the motor 22, thereby effecting an upward movement of the piston 23 and a further opening of the valve 20. This movement in turn causes an upward movement of the dashpot and through the lever 29, the link 33 and the floating lever 17 an upward movement of the pilot valve 20 until the latter resumes its original position. The restoring of the original position of the pilot valve is also partly accomplished by the expansion of the bellows 14 owing to the rise in pressure.

At the end of the after-regulation the left-hand end 36 of the floating lever 29 is in its original position shown in the drawing and also the left-hand end 32 and the pivot 43 of the lever 17 are in their original positions shown in the drawing, which means that the right-hand end 19 of the lever 17 must be in its original position. This, however, means that the bellows is in exactly the same state in which it was originally, that is subjected to exactly the same pressure which existed before the regulation took place.

If the demand for elastic fluid decreases, the operation of the regulating mechanism is similar to the one described, with the various elements moving in opposite direction as before.

With the arrangement shown in Fig. 1, I have accomplished a regulating mechanism which permits maintaining the pressure or like condition of an elastic fluid conducted through a conduit being maintained constant, irrespective of changes in the flow or demand for elastic fluid. I have analyzed the operation as comprising two parts, the operation of an ordinary mechanism and an after-regulation. These two operations obviously take place simultaneously because the valve 35 for the dashpot bypass is normally kept open. The sensitivity of the mechanism depends to a large extent on the opening of the valve 35 in the bypass 34. The dashpot with its bypass at the same time represents, in known manner, a means for preventing hunting and overshooting of the control valve 12.

In the arrangement of Fig. 2 I have shown a mechanism according to my invention which permits zero regulation as does the mechanism in Fig. 1, but which also permits positive and negative regulation. With the exception of the fixed supports 38 and 39 in Fig. 1, the mechanism in Fig. 2 includes the same elements arranged in the same relation as in Fig. 1. These elements therefore have been designated with the same reference characters as in Fig. 1. Instead of the fixed supports 38 and 39 of Fig. 1 I provide in the arrangement of Fig. 2 two adjustable supports 50 and 51 fastened to a rod 52 which latter with its lower end slides through an opening in a member 53 and has its upper end pivoted at 54 to a lever 55. The left-hand end 56 of the lever 55 is pivoted to the upper end of a rod 57 which latter has its lower end fastened by means of a bracket 58 to the dashpot 26. The lever 55 has a slot 59 extending to the left and to the right of the pivot 54. The lever 55 is pivoted to a member 60 which has a pivot 61 projecting through the slot 59 and an upper part slidable in a slot 62 of a fixed member 63. The member 60 represents an adjustable fulcrum for the lever 59, which fulcrum may be pivoted to the lever at different points to the right and the left of the pivot 54. The adjustable fulcrum 60 may be fixed in any position by means of a wing screw 64 projecting through the slot 62 in the fixed member 63. For different positions of the fulcrum 60 we obtain different regulations of the mechanism. More specifically, with the fulcrum in alinement with the rod 52 we obtain zero regulation and with the fulcrum located at the left of this rod we obtain negative and at the right of this rod positive regulation.

Let us assume that the mechanism is adjusted for zero regulation, that is, the member 60 is located in alinement with the rod 52. In this case we have exactly the same operation as with the arrangement shown and described in connection with Fig. 1. In addition thereto the link 57 is moved upward during increase of the flow, causing a turning movement of the rod 55 about the pivot 61. As this pivot, however, is located above the pivot 54 and practically coincides with the latter, no movement of the rod 52 and the spring supports 50 and 51 takes place, that is, the spring supports 50 and 51 remain in their position just as the corresponding fixed spring supports 38 and 39 of Fig. 1.

Let us now assume the adjustable fulcrum 60 be positioned for negative regulation, as shown in the drawing, and let us keep in mind that during increasing flow an upward movement of the dashpot 26 and the rod 37 takes place, thereby tensioning the spring 41 and compressing the spring 42, the same as was the case in the operation of the arrangement in Fig. 1. Now, in the arrangement of Fig. 2, an upward movement of the dashpot 26 also causes an upward movement of link 57, causing the lever 55 to turn about the pivot 61 whereby the left-hand end 56 is raised and the pivot 54 is lowered. The lowering of pivot 54 causes a downward movement of the rod 52 and the spring supports 50 and 51 which are rigidly connected to the rod 52. The downward movement of the spring supports causes an additional tensioning of the spring 41 and an additional compressing of the spring 42.

The main operation of the mechanism causes clockwise turning of the lever 29 about its fulcrum into the dash-dotted line position, indicated in the drawing at A. The springs 41 and 42, being in an unbalanced state, effect through the intermediate plate 40 fastened to the rod 37 a downward movement of the rod, causing downward movement of the pivot 36 connecting said rod with the lever 29 until the springs have reached a balanced state. Owing to the fact that the spring supports 50 and 51 have been moved downward, this balanced state of the spring is reached only after the pivot 36 has reached a position below its original position, that is, when the lever 29 has assumed a position shown by the dash-dotted line B. In this position, however, the link 33 connecting the fulcrumed lever 29 with the floating lever 17 has been moved downward relative to its original position with its lower pivot 32 located below its original position. Thus when the mechanism has reached a balanced condition with the pilot valve 20 and its upper pivot 43 in their original position the lever 17 must be turned in counterclockwise direction as indicated by the dash-dotted line C—C. The right-hand end 19 of the lever 17 has been raised, which means that the pressure must have increased, that is, an increase in flow has resulted in an increase in pressure, a characteristic of the mechanism termed negative regulation.

If the demand for elastic fluid decreases, the operation of the mechanism is similar to that described above with the different elements moving in opposite direction and resulting in a decrease in pressure.

If the movable member 60 is connected to the lever 59 at the right-hand side of pivot 54, we obtain a positive regulation, the same as with an ordinary regulating mechanism. During such an operation upward movement of the dashpot causes upward movement of the rods 57, resulting in a tensioning of the spring 41 and a compressing of the spring 42. At the same time the upward movement of the rod 57 and the turning movement of the lever 55 causes upward movement of the rod 52 whereby the tensioning and compressing of spring 41 and 42 respectively are relieved or compensated and if the pivot 61 is located far enough to the right of the pivot 54 the turning movement of rod 56 causes an overcompensation. Under these conditions fulcrumed lever 29 is only partly returned to its original position or moved even further away, resulting in a positive regulation of the mechanism.

A regulating mechanism according to my invention is advantageous in all cases where it is desired to maintain constant pressure or increasing pressure with increasing flow of elastic fluid. A negative regulation is particularly advantageous where elastic fluid is conducted through a long distance conduit to a consumer because the increasing pressure during increased load demand compensates the increased pressure losses whereby the elastic fluid may be delivered to the consumer at substantially constant pressure.

Having described the method of operation of my invention, together with the apparatus which I now consider to represent the best embodiments thereof, I desire to have it understood that the apparatus shown is only illustrative and that the invention may be carried out by other means.

What I claim as new and desire to secure by Letters Patent of the United States is:—

1. The combination of a consumer, a conduit for conducting elastic fluid to the consumer, valve means in the conduit for controlling the flow of fluid, and a governing mechanism for controlling the valve means comprising a device responsive to a condition of the fluid and being connected to the conduit behind the valve as regards the direction of flow, a control member having a neutral position and being directly connected to and moved by the device in response to any change in flow, a motor connected to the valve means and controlled by the control member in response to any movement of the latter, a fulcrumed lever connected to the control member, a dashpot connecting the motor to the lever, and spring means connected to the fulcrumed lever for maintaining constant the condition of the fluid at varying flow.

2. The combination of a consumer, a conduit for conducting elastic fluid to the consumer, valve means in the conduit for controlling the flow of fluid, a pressure responsive device connected to the conduit behind the valve means as regards the direction of flow, a pilot valve having a port and a head normally covering the port and directly connected to and moved by the pressure responsive device in response to any change in flow, a hydraulic motor connected to the valve means and controlled by the pilot valve, the pilot valve being arranged normally to assume a neutral position and to effect movement of the motor in response to any movement of the pressure responsive device, a follow-up mechanism including a dashpot connecting the motor to the pilot valve, a support, spring means connected between the support and the dashpot, and adjustable means for moving the support in response to movement of the valve means whereby a predetermined pressure regulation for varying flow of fluid is maintained.

3. The combination of a consumer, a conduit for conducting elastic fluid to the consumer, valve means in the conduit for controlling the flow of fluid, a pressure responsive device connected to the conduit behind the valve means as regards the direction of flow, a pilot valve with a neutral position having a head directly connected to and moved by the pressure responsive device in response to any change in flow, a hydraulic motor connected to the valve means and controlled by the pilot valve, the pilot valve being arranged normally to assume a neutral position and to effect movement of the motor in response to any movement of the pressure responsive device, a follow-up mechanism including a dashpot having a cylinder connected to the motor and a piston connected to the pilot valve, a support, normally balanced spring means connected between the piston and the support, means for moving the support in response to movement of the valve means comprising a lever having one point connected to the support and another point connected to the piston, and a fulcrum for the lever, said fulcrum being adjustable along the lever to effect positive, zero, or negative regulation of the mechanism whereby a predetermined pressure regulation may be maintained for varying flow conditions.

4. The combination of a consumer, a conduit for conducting elastic fluid to the consumer, valve means in the conduit for controlling the flow of fluid, a pressure responsive device connected to the conduit behind the valve means as regards the direction of flow, a pilot valve with a neutral position having a head directly connected to and moved by the pressure responsive device in response to any change in flow, a hydraulic motor connected to the valve means and controlled by the pilot valve, the pilot valve being arranged normally to assume a neutral position and to effect movement of the motor in response to any movement of the pressure responsive device, a follow-up mechanism including a dashpot having a cylinder connected to the motor and a piston connected to the pilot valve, and adjustable means connected between the cylinder and the piston for moving the piston relative to the cylinder to effect zero or varying negative regulation of the mechanism and to maintain with a certain setting of the adjustable means a predetermined regulation independent of the flow of fluid.

PAUL DETTENBORN.